United States Patent Office 2,830,059
Patented Apr. 8, 1958

2,830,059

PURIFICATION OF N-VINYLCARBAZOLE

Samuel Aaron Miller and Harold Davidge, London, England, assignors to The British Oxygen Company Limited, a British company No Drawing. Application October 22, 1957
Serial No. 691,537

Claims priority, application Great Britain
November 5, 1956

4 Claims. (Cl. 260—318)

This invention relates to the purification of N-vinylcarbazole.

It is known that N-vinylcarbazole can be polymerised by heating, preferably in the presence of a catalyst. Known catalysts for this polymerization include boron fluoride, stannic chloride, zinc chloride, aluminum chloride and many other compounds of acidic character. It has also been proposed to use a catalyst which is self-generated in the vinylcarbazole by prior exposure of the finely divided solid to the atmosphere. The polymer produced in the presence of these catalysts, however, contains an appreciable proportion of unpolymerised monomer.

More recently, it has been proposed to polymerise vinylcarbazole in the presence of azo compounds which give free radicals on heating, preferably whilst excluding atmospheric oxygen, and, if desired, in the presence of ditertiary butyl peroxide or other similar peroxides. This process produces polymers of higher molecular weight than those previously obtained and also gives substantially complete conversion of the monomer to polymer.

It has now been observed that whereas the behavior of the acidic type catalysts is not much affected by trace impurities in the vinylcarbazole, azo catalysts with or without the addition of ditertiary butyl peroxide are highly sensitive to the presence of certain impurities in the vinylcarbazole and particularly to sulphur compounds. Such sulphur compounds are present in vinylcarbazole made by the vinylation of carbazole derived from certain coal tar sources. It is conceivable that the amount of such sulphur compounds will vary with the sulphur content of the coal originally carbonised, but it appears that there is always sufficient sulphur compound in vinylcarbazole from this source to interfere with the ditertiary butyl peroxide and azo catalysts.

It has been observed that normal processes of purification fail to remove the undesired impurities. Such processes include recrystallisation from a variety of solvents, distillation under various conditions of pressure, chromatographic separation, and a variety of the more usual chemical treatments, such as oxidation, hydrogenation and the like and any simple combination of these processes.

It is an object of the present invention to provide a method of removing from N-vinylcarbazole the sulphur compounds which interfere with its polymerisation in the presence of ditertiary butyl peroxide or other similar peroxides and azo catalysts.

According to the present invention, a method of purifying N-vinylcarbazole derived from a coal tar source, to reduce substantially the amount of impurities therein which interfere with its subsequent polymerization in the presence of an azo catalyst with or without ditertiary butyl peroxide or other similar organic peroxide comprises treating the vinylcarbazole at a temperature above its melting point but below 120° C. with from 0.25 to 2.5% by weight of the weight of vinylcarbazole of an azo compound or azo compounds which furnish free radicals on heating to the reaction temperature used.

The treated vinylcarbazole may, if desired, be subjected to recrystallisation but this step is not essential.

The purified vinylcarbazole may now be polymerised by means of an azo catalyst with or without ditertiary butyl peroxide or another similar organic peroxide and yields a satisfactory polymer of high molecular weight and high conversion. This result cannot be achieved in one step from sulphur-containing monomer by initiating the polymerisation with ditertiary butyl peroxide and an excess of the azo compound. Such conditions cause the formation of a very inferior polymer having low conversion and poor mechanical strength.

Particularly useful examples of azo compounds which may be used in the process of the present invention are 2:2'-azobisisobutyronitrile, $$(CH_3)_2C(CN).N:N(CN)C(CH_3)_2$$

and 2:2'-azobis (methyl isobutyrate),

The time of treatment of the impure vinylcarbazole with the azo compound can be varied. Preferred times will depend on the initial content of impurities, the temperature of operation and the quantity of azo compound used. Under average conditions, periods of 15–45 minutes have been found useful, but the invention is not limited to such periods of treatment.

The process is illustrated by the following example:

Vinylcarbazole was prepared by reaction of acetylene with carbazole derived from coal tar material, and the product was purified by normal methods, to give a material of melting point 64° C., in the form of colourless platelets. The material was of high purity, apart from the presence of sulphur compounds in an amount equivalent to a sulphur content of 0.15%.

If exposed to the atmosphere at ambient temperature to generate a catalyst, and thereafter heated to 70° C., this material would polymerise in less than 5 minutes to give a hard colourless block, but the polymerised material still contained up to 20% by weight of unpolymerised monomer.

The material was not polymerised when heated up to 150° C. with ditertiary butyl peroxide in the absence of oxygen, either in the presence of azobisisobutyronitrile or in the absence thereof.

In accordance with the invention, 100 parts of the vinylcarbazole were heated to about 100° C. with 1 part of azobisisobutyronitrile for 30 minutes. During this period, a slight effervescence was observed, but no thickening occurred. The treated vinylcarbazole was subsequently recrystallised from methanol.

The recrystallised material was found on an analysis to contain less than 0.01% of sulphur as sulphur compounds. When it was heated to 80–90° C. with 0.02% by weight of ditertiary butyl peroxide and 0.01% by weight of azobisisobutyronitrile under an inert gas pressure of 40 atm., polymerisation took place within 30 minutes to give a hard block of material of high molecular weight and substantially free from unpolymerised monomer.

We claim:

1. The method of purifying N-vinylcarbazole derived from a coal-tar source to reduce substantially the amount of impurities therein which interfere with its subsequent polymerisation in the presence of azo catalyst and optionally in the presence of an organic peroxide, which comprises treating the N-vinylcarbazole at a temperature above its melting point but below 120° C. with from 0.25 to 2.5% by weight of the N-vinylcarbazole of at least one azo compound which furnishes free radicals on heating to the reaction temperature used.

2. Method according to claim 1 wherein the treated N-vinylcarbazole is subjected to recrystallisation.

3. Method according to claim 1 wherein the azo compound is selected from the group consisting of 2:2'-azobisisobutyronitrile and 2:2'-azobis (methyl isobutyrate).

4. Method according to claim 1 wherein the N-vinylcarbazole is treated with the azo compound for 15–45 minutes.

No references cited.